March 14, 1933.  T. S. BEESON  1,901,491
GLASS MACHINERY
Filed July 25, 1929  2 Sheets-Sheet 1
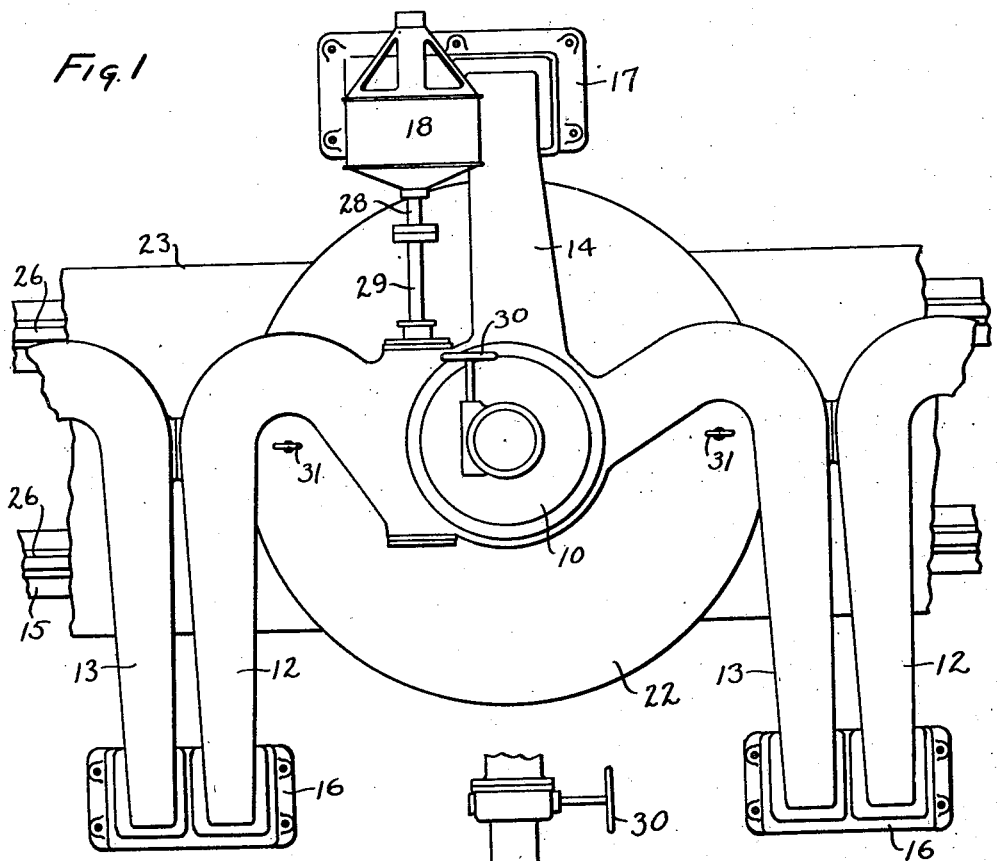
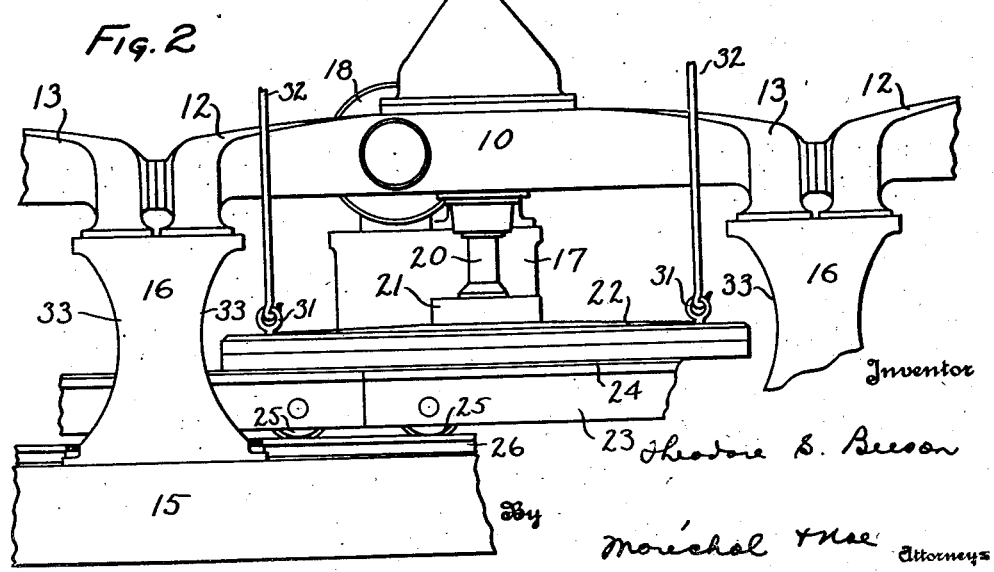
Inventor
Theodore S. Beeson
By Maréchal + Mae Attorneys March 14, 1933.  T. S. BEESON  1,901,491
GLASS MACHINERY
Filed July 25, 1929  2 Sheets-Sheet 2
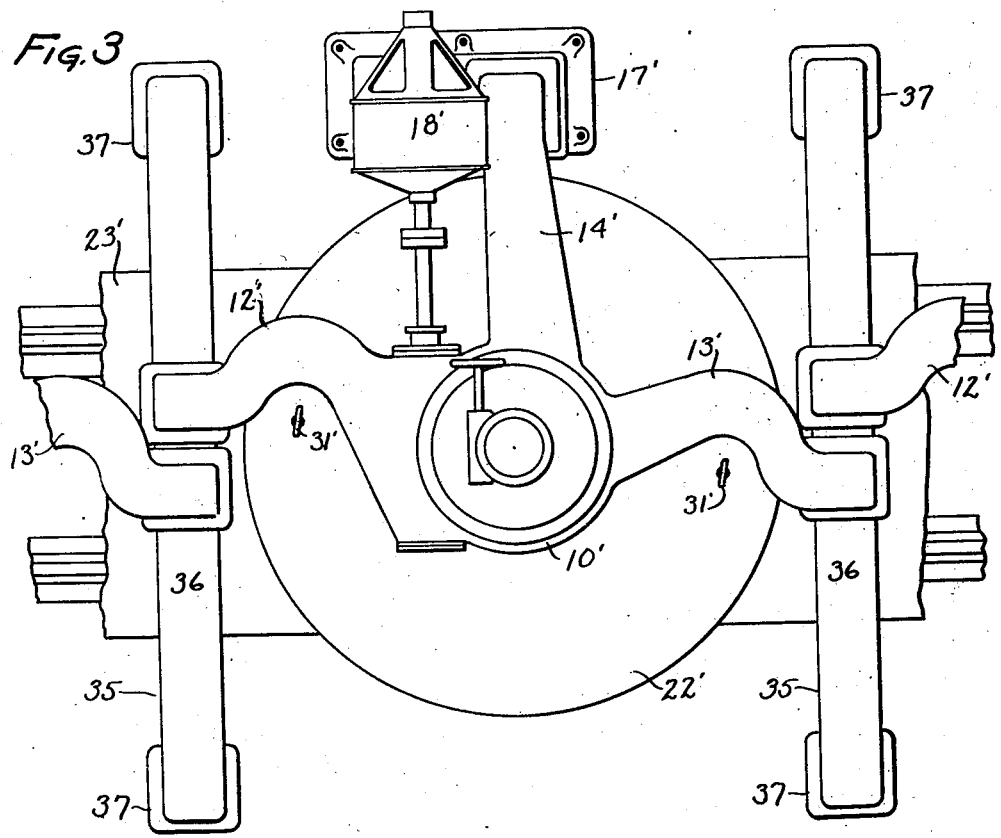

Patented Mar. 14, 1933

1,901,491

UNITED STATES PATENT OFFICE

THEODORE S. BEESON, OF HAMILTON, OHIO, ASSIGNOR, BY MESNE ASSIGNMENTS, TO LIBBEY-OWENS-FORD GLASS COMPANY, OF TOLEDO, OHIO, A CORPORATION OF OHIO

GLASS MACHINERY

Application filed July 25, 1929. Serial No. 380925.

This invention relates to glass manufacture and particularly to machines for working plate glass in sheet form.

One of the principal objects of the invention is to provide a glass working machine in which the parts are readily accessible for repair or replacement.

Another object of the invention is the provision of a continuous glass working machine having a frame which is rigid and free from vibration and from which the runners may be readily removed.

Other objects and advantages of the invention will be apparent from the following description, the accompanying drawings and the appended claims.

In the drawings, in which like characters of reference designate like parts throughout the several views, Fig. 1 is a plan view of a plate glass grinding machine embodying the present invention;

Fig. 2 is an elevational view of Fig. 1; and

Fig. 3 is a plan view of a modified form of grinding machine.

The invention is herein shown as applied to glass working machinery such as is used for finishing the surface of plate glass or the like, made by the continuous process. In this process the glass sheets are generally continuously formed and continuously fed through a grinding and polishing machine which smooths and polishes the surface of the glass sheet. During the finishing operation the glass sheets are carried on a procession of abutting tables which advance at a steady rate under the battery of grinding and polishing units which are arranged one following another. Each grinding unit is provided with a rotatable disk or runner whose underside is fitted with a plurality of grinding shoes which contact with the surface of the glass to smooth and level it in preparation for polishing. The polishing units, which follow the grinding machines, are similarly provided with runners having polishing surfaces and are similar in general characteristics to the grinding units. After continued use the runners of the grinding and polishing machines must be removed from the machines so that the grinding shoes and polisher blocks may be replaced or repaired. The present invention has to do with large continuous glass installations of this character having power handling equipment for the runners which will permit easy removal and replacement of the runners, without disturbing the supporting structure.

Referring to the drawings, the numeral 10 designates the hub portion of the stationary frame of a glass grinding machine; of which a series are positioned in line adjacent one another. Supporting arms 12, 13 and 14 extend outwardly from the hub portion of each machine to provide a three point suspension for each frame. The supporting arms rest on pedestals which extend upwardly from the foundation 15. The supporting arms 12 and the supporting arms 13 of adjacent machines rest on pedestals 16 at one side of the machine, while the supporting arms 14 rest on pedestals 17 on the opposite side of the machine from the pedestals 16. Each pedestal 17 serves also as a supporting base for a driving motor 18 which is provided for each grinding or polishing unit. The hub portion 10 of each stationary frame carries, by means of suitable bearings, a perpendicularly extending shaft 20 for rotational movement therein. Removably attached to the lower end of the shaft 20 by means of a coupling 21 is a horizontally positioned runner 22. The shaft 28 of each driving motor 18 is coupled to a shaft 29 which extends from the hub portion 10 of the stationary frame and is attached to suitable gearing within the hub portion which serves to drive the shaft 20 of the runner to provide rotational movement of the attached runner. Vertical movement of the runner 20 is provided by suitable adjusting mechanism within the hub portion 10 which is actuated by movement of the hand wheel 30 or the like. The runners, one being provided on each grinding unit, have removably attached to their under surfaces, by means of bolts or screws, a plurality of grinding shoes of usual form. The grinding is accomplished in the usual manner by feeding a grinding compound of sand and water to the grinding shoes as they are rotated over the surface of the glass being finished.

The glass being worked upon is carried beneath the working surface of the runners 22 and the runners are adjusted so that the grinding shoes will contact with the surface of the glass to remove the high spots and rough portions of the glass as it progresses through the grinding units in preparation for subsequent polishing. The glass sheet 24 is supported in its travel upon the flat top surface of a series of cars tables, one of which is shown at 23. In endless procession these cars abut one another end to end and have their top surfaces accurately aligned to provide a continuous moving level table in which there is no break or unevenness. The cars 23 are supported by wheels 25 upon rails 26 which are anchored to the foundation 15. The driving means for the car train comprises a pusher mechanism of conventional design which is not shown.

The upper surface of each runner 20 is provided with carrying means shown as a pair of eyes or loops 31 which are rigidly fixed to the runner and are positioned along a diameter of the runner. Of course if the runner were not symmetrically balanced these eyelets would be positioned along its axis of gravity, which would in that event not correspond to a diameter. These loops 31 when attached to lifting means, such as hooks 32 which may be attached to a crane beam (not shown) serve to support the runner when it is detached from its shaft so that it may be readily and easily removed from or replaced in operative position.

The supporting arms 12 and 14 are so positioned that the runner may be detached and removed from its position on its shaft without having the crane lifting members or runner encounter interference from the stationary frame of the machine. The pedestals 16 are proportioned, as at 33, to provide clearance so that the runner 22 may be moved out between them.

The grinding machine of Fig. 3 comprises a hub portion 10' within which is housed the driving and adjusting mechanism for the runner 22'. Extending outwardly from the hub portion 10' are the supporting arms 12', 13' and 14'. The supporting arms 12' and the suporting arms 13' of the adjacent machines are supported on transverse members 35 which are positioned at right angles to the direction of travel of the glass supporting cars 23' and comprise a substantially horizontal portion 36 upon which the arms 12' and 13' rest, and upstanding portions 37 which are attached to the foundation in some suitable manner. The span of the upright portions 37 is sufficient to permit the passage of the glass carrying cars 23', and the spacing between the uprights 37 of adjacent transverse members 35 is sufficient to permit the removal of the runner 22' by means of lifting hooks attached to the loops 31' in the top surface of the runner. The supporting arms 14' together with the driving motors 18' rest on a pedestal 17' which is positioned to one side of the path of the glass carrying cars. The supporting arms 12' and 13' are so shaped that the loops 31', which are positioned on the axis of gravity of the runner 22', are accessible to lifting means to provide for the removal of the runner without encountering any interference from the supporting frame of the grinding machine.

The runners of the polishing machines are provided with similar eyes or loops to aid in their removal or replacement.

While the methods herein described, and the forms of apparatus for carrying these methods into effect, constitute preferred embodiments of the invention, it is to be understood that the invention is not limited to these precise methods and forms of apparatus, and that changes may be made in either without departing from the scope of the invention which is defined in the appended claims.

What is claimed is:

1. In a glass grinding machine having a glass supporting table, a runner rotatably supported thereabove, and supporting means for said runner comprising a unitary three-point supporting member comprising a hub, and three arms extending laterally therefrom, a plurality of pedestals upon which the ends of said arms respectively rest, said laterally extending arms being arranged as to their ends to give a stable three point support for said runner and so shaped throughout their extent that a portion of each arm lies on a given side of an axis of gravity of the runner to permit lateral removal of said runner while supported by a vertically positioned removing means.

2. In a glass working machine adapted to operate on a glass sheet traveling through the machine, a glass grinding runner, a shaft attached thereto, and means for rotatably supporting said shaft comprising a spider having a shaft carrying hub portion and arms projecting integrally therefrom, each having an end portion adapted to rest upon a supporting pedestal, one of said arms terminating at one side of the line of travel of the glass and projecting substantially transverse of the line of travel, and a pair of said arms projecting in substantially opposite directions from said hub and curving so as to extend across the median line of travel to provide a stable three point suspension.

3. In a glass working machine, a carrier track adapted to support a continuously fed glass sheet for passage through the machine, a rotatable runner, a runner shaft, a hub rotatably supporting said shaft and arms extending from said hub to both sides of the carrier track, the arms extending to one side of the carrier track being formed to provide spaces vertically above diametrically spaced points on the runner for suspension of the runner in a substantially horizontal position from said opposed points, to permit its removal without interference from the arms.

4. In a glass working machine, adapted to operate on a continuously fed glass sheet traveling through the machine, a rotatable runner, a runner shaft, a hub rotatably supporting said shaft, and arms extending from said hub to both sides of the line of travel of the glass sheet, the arms extending to one side of said line forming an open yoke shaped to provide recesses extending from said one side to points vertically above spaced suspension points on the runner for substantially horizontal two point suspension of the runner from above and for removal of the runner without interference from the arms.

5. In a glass working machine adapted to operate on a glass sheet traveling through the machine, a rotatable runner, a runner shaft, a hub rotatably supporting said shaft, and arms extending from said hub to both sides of the median line of travel of the glass sheet, the arms extending to one side of the said line being for a portion of their extent on the same side of a vertical plane passing through the runner axis of gravity, as the arm that terminates on the opposite side, to provide spaces affording access to diametrically opposed points on the runner for substantially horizontal suspension of the runner from above and for removal of the runner without interference from the arms.

6. A glass grinding machine having a glass supporting table, a runner supported thereabove, and supporting means for said runner comprising a hub, a runner shaft supported thereby, a plurality of supporting arms extending laterally from said hub, means for the supporting of said arms, each arm being so shaped between the hub and support and with respect to an axis of gravity of the runner as to permit vertical attachment of laterally movable removing means to the said runner along said axis of gravity, and means spaced along said axis of gravity for receiving said removing means to suspend said runner in substantially horizontal positioning for removal.

7. In a glass grinding machine having a glass supporting table, a runner rotatably supported thereabove, and supporting means for said runner comprising a hub, a plurality of supporting arms extending laterally therefrom, means for supporting each of said arms at a point remote from the hub, the laterally extending arms which extend to a given side of the median line of the glass sheet being each arranged and so shaped throughout its extent that a portion of each said arm lies on a given side of an axis of gravity of the runner to permit lateral removal of said runner while supported by a vertically positioned laterally movable removing means.

In testimony whereof I hereto affix my signature.

THEODORE S. BEESON.